(12) United States Patent
Williams et al.

(10) Patent No.: US 6,435,474 B1
(45) Date of Patent: Aug. 20, 2002

(54) NON-CONTAMINATING GAS-TIGHT VALVE FOR SEMICONDUCTOR APPLICATIONS

(75) Inventors: Dick Stetson Williams; Treaf Andrus, both of Houston, TX (US); Timothy J. Kulage, Baton Rouge, LA (US); Ken Harrell, Deer Park, TX (US)

(73) Assignee: MEMC Electronic Materials, Inc., St. Peters, MO (US)

( * ) Notice: Subject to any disclaimer, the term of this patent is extended or adjusted under 35 U.S.C. 154(b) by 0 days.

(21) Appl. No.: 09/608,304

(22) Filed: Jun. 30, 2000

(51) Int. Cl.[7] .............................. F16K 5/06; F16K 5/22
(52) U.S. Cl. ................. 251/315.05; 251/314; 251/368; 137/237; 222/554; 414/216
(58) Field of Search .................. 251/315.03, 315.04, 251/315.05, 314, 316, 317, 368; 222/554; 137/375, 237, 238; 414/195, 209, 216

(56) References Cited

U.S. PATENT DOCUMENTS

| | | | |
|---|---|---|---|
| 3,356,333 A | * 12/1967 | Scaramucci | 251/315.05 X |
| 3,503,415 A | * 3/1970 | De Angelis et al. | 251/368 X |
| 3,744,755 A | * 7/1973 | Gary, Jr. et al. | 251/315.03 X |
| 3,837,356 A | 9/1974 | Selep et al. | 137/375 |
| 4,130,268 A | * 12/1978 | Kojima et al. | 251/298 |
| 4,299,338 A | * 11/1981 | Jain et al. | 222/152 |
| 4,337,920 A | 7/1982 | Parris | 251/357 |
| 4,385,747 A | * 5/1983 | Renaud, Jr. et al. | 251/317 X |
| 4,856,758 A | 8/1989 | Knapp | 251/251 |
| 4,911,616 A | 3/1990 | Laumann, Jr. | 417/413 |
| 5,152,433 A | 10/1992 | Mohri | 222/152 |
| 5,165,548 A | * 11/1992 | Dumler et al. | 209/2 |
| 5,202,099 A | 4/1993 | Boone et al. | 422/310 |
| 5,205,998 A | 4/1993 | Boone et al. | 422/310 |
| 5,353,832 A | * 10/1994 | Berchem | 137/375 |
| 5,435,521 A | * 7/1995 | Jarecki | 137/238 X |

* cited by examiner

*Primary Examiner*—Lesley D. Morris
*Assistant Examiner*—Eric Keasel
(74) *Attorney, Agent, or Firm*—Senniger, Powers, Leavitt & Roedel

(57) ABSTRACT

A non-contaminating gas-tight valve for controlling a flow of granular polysilicon. The valve has a spherical valve member formed from single-crystal polysilicon, so that any particles worn from the valve member during use will be non-contaminating polysilicon. The valve member has a passage through which granular polysilicon flows when the valve is in an open position. When rotated perpendicular to the flow, the passage no longer permits movement of granular polysilicon through the valve. The valve member has a smooth finish and is wiped clean when rotated against non-abrasive upper and lower seats, reducing the likelihood of valve member wear. A cavity between the valve member and the valve body allows for removal of excess granular polysilicon from the valve, inhibiting the valve from seizing due to excess granular polysilicon slipping past the upper valve seat and accumulating within the valve. The valve additionally forms a gas-tight seal between an upstream and downstream side of the valve.

6 Claims, 8 Drawing Sheets

FIG. 14  FIG. 13
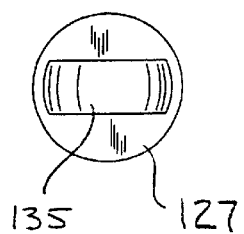 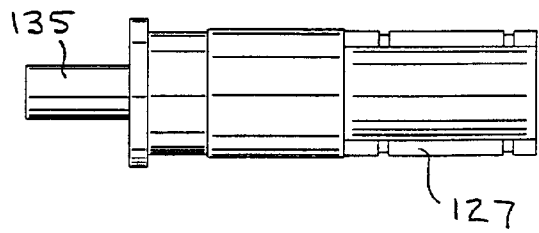
FIG. 15  FIG. 17
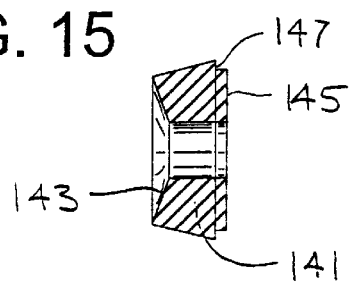 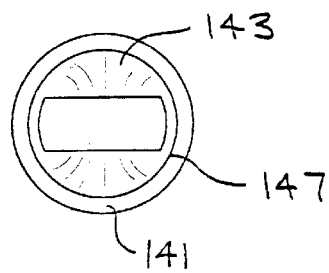
FIG. 16
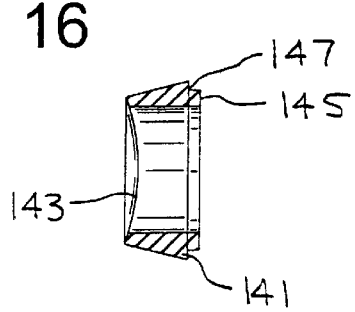

NON-CONTAMINATING GAS-TIGHT VALVE FOR SEMICONDUCTOR APPLICATIONS

BACKGROUND OF THE INVENTION

This invention relates generally to valves and more particularly to a non-contaminating and gas-tight valve designed for regulating a flow of granular polysilicon through the valve.

Conventionally, valves of various construction regulate flows of liquid, solid, and semi-solid materials. Common valve types include globe valves, gate valves, check valves, butterfly valves, and ball valves. Each valve type is specifically suited to a particular application. Adjustable ball valves are conventionally used in applications where the valve adjusts between fully open and fully closed. Although not specifically designed to throttle flow, ball valves may be adjusted between open and closed positions to throttle or adjust flow. Ball valves typically contain a metallic, plastic, or ceramic ball, which is rotatable about an axis perpendicular to the flow. A cylindrical channel passes through the center of the ball. When the channel is perpendicular to the flow, the valve is closed. When the channel is parallel to the flow, the valve is open. When the ball is at any point in between, the valve is partially open.

Depending upon the material and environmental requirements, valves are typically constructed of plastic, metal, rubber, and ceramic parts. As with all mechanical apparatus with moving parts, valves are susceptible to wear. Moving parts rubbing against one another and matter flowing through the valve contacting the parts causes valve wear. Dust and particle accumulation on a valve's moving parts also causes wear during operation. Wear inevitably leads to contamination of the material flowing through the valve by particles generated from the valve wear. Such wear may or may not be acceptable depending upon the purity requirements of the material flowing through the valve. In the semiconductor industry, handling of granular polysilicon requires minimal particulate contamination. As such, conventional valves having metallic or plastic parts have substantial drawbacks when applied to granular polysilicon because foreign particulate matter from the valve as it wears will inevitably contaminate the granular polysilicon. Therefore, there is a need for a valve which (1) is wear resistant and (2) is less apt to cause contamination as a result of wear.

SUMMARY OF THE INVENTION

Among the several objects of this invention may be noted the provision of such a valve that avoids generation of metallic particles or other contaminants without compromising sealing integrity; the provision of such a valve that is wear resistant; the provision of such a valve that inhibits the valve from seizing due to excess material accumulating within the valve; the provision of such a valve that has non-contaminating members holding the moving parts of the valve in place; and the provision of such a valve that forms a gas-tight seal between an upstream and downstream side of the valve through a single gas-tight seat placed between the moving valve member and the valve body.

In general, a valve apparatus for controlling a flow of granular polysilicon is disclosed. The valve apparatus inhibits contamination of the granular polysilicon by foreign materials. The valve apparatus comprises a valve body having an inlet and an outlet sized and shaped to allow granular polysilicon to flow into and out of the valve body. The valve apparatus additionally comprises a movable valve member arranged within the valve body for regulating the flow through the valve body. The movable valve member is formed from single-crystal silicon to reduce valve wear and inhibit creation of metal particles or similar contaminants within the flow of granular polysilicon. The movable valve member is movable between an open position where the granular polysilicon may flow through the valve body and a closed position where the granular polysilicon cannot flow through the valve body.

In a second embodiment of the present invention, a valve member formed from single-crystal silicon generally as set forth above is disclosed.

In a final embodiment of the present invention, a granular polysilicon handling system for controlling a flow of granular polysilicon is disclosed. The handling system comprises at least one material hopper sized and shaped to hold granular polysilicon within the system and at least one valve apparatus as set forth above.

Other objects and features will be in part apparent and in part pointed out hereinafter.

BRIEF DESCRIPTION OF THE DRAWINGS

FIG. 13 is a front elevation of a valve stem of the valve;

FIG. 14 is a left elevation of the valve stem of FIG. 13;

FIG. 15 is a vertical section of a carrier of the valve;

FIG. 16 is a top section of the carrier of FIG. 15;

FIG. 17 is a left elevation of the carrier of FIG. 15;

Corresponding reference characters indicate corresponding parts throughout the several views of the drawings.

DETAILED DESCRIPTION OF THE PREFERRED EMBODIMENTS

Figure 1:
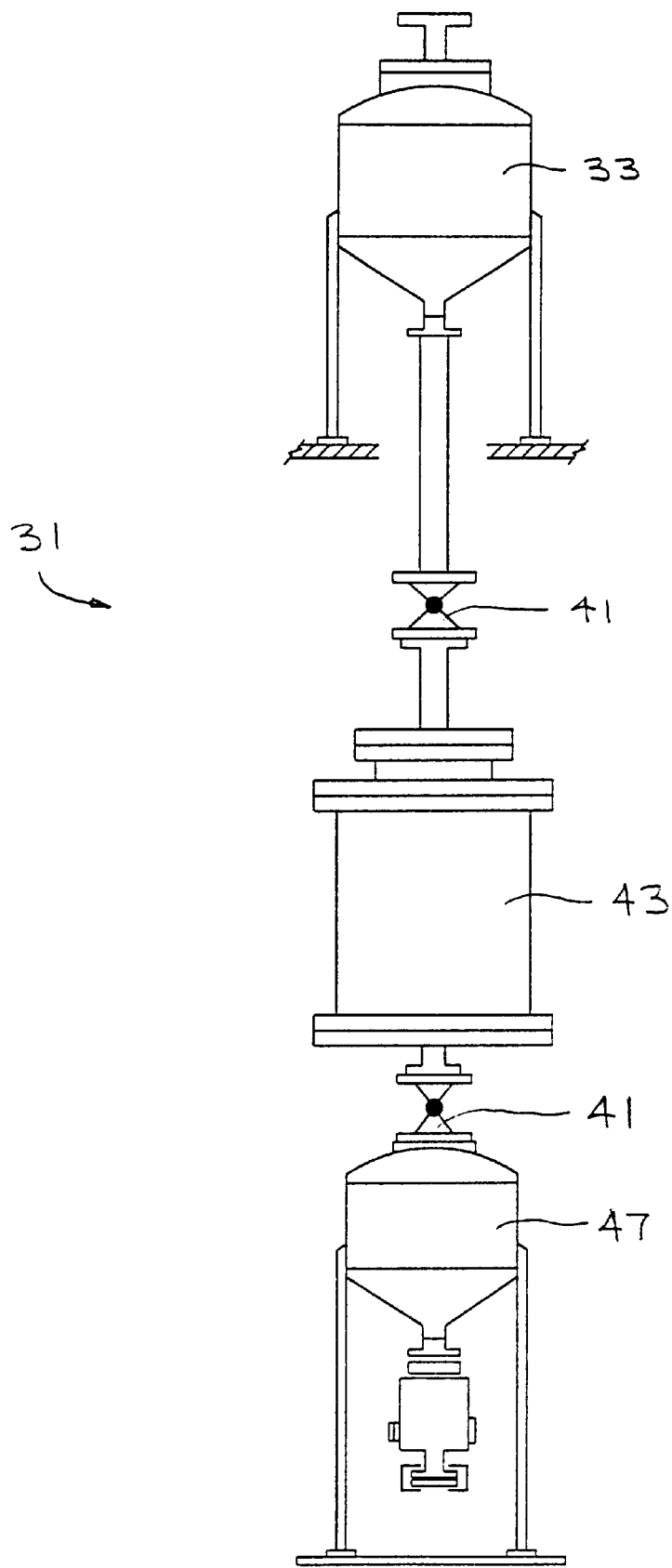
FIG. 1 is a schematic of a granular polysilicon handling system having at least one non-contaminating gas-tight valve.

Referring now to the drawings and specifically to FIG. 1, a granular polysilicon handling system is generally indicated at 31. The manufacture of granular polysilicon requires frequent product handling in a vertical direction. Handling systems are typically comprised of a series of valves and pipes connecting multiple pieces of material handling equipment, including hoppers, portable vessels, and reactors. FIG. 1 shows a schematic of such a system 31. The schematic shows only the substantive components of the system 31, removing several piping connections for simplicity. The granular polysilicon enters the system 31 through an inlet hopper 33 located at the top of the system. It then passes from the inlet hopper 33 through a non-contaminating gas-tight valve 41 of the present invention (FIG. 1). The non-contaminating gas-tight valve 41 will be described in detail below. In the overall handling system 31, the valve 41 can isolate portions of the handling system so that granular polysilicon and gas cannot pass through the valve. Below the gas-tight valve 41, the granular polysilicon enters a vessel 43 for treatment of the granular polysilicon. The treated polysilicon then passes through another gas-tight valve 41, finally entering an outlet hopper 47 (FIG. 1).

Figure 2:
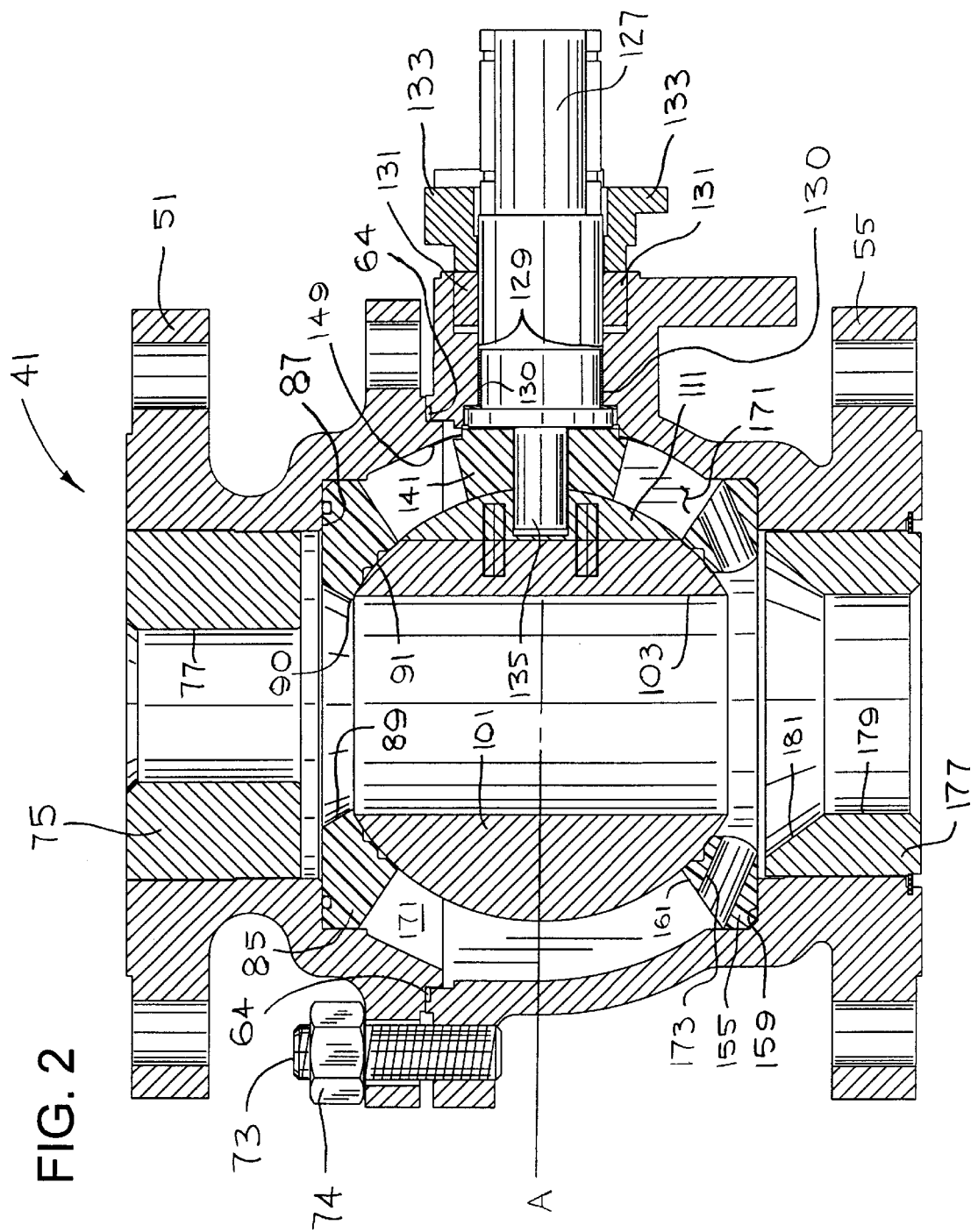
FIG. 2 is a vertical section of the non-contaminating gas-tight valve of the present invention.
Figure 3:
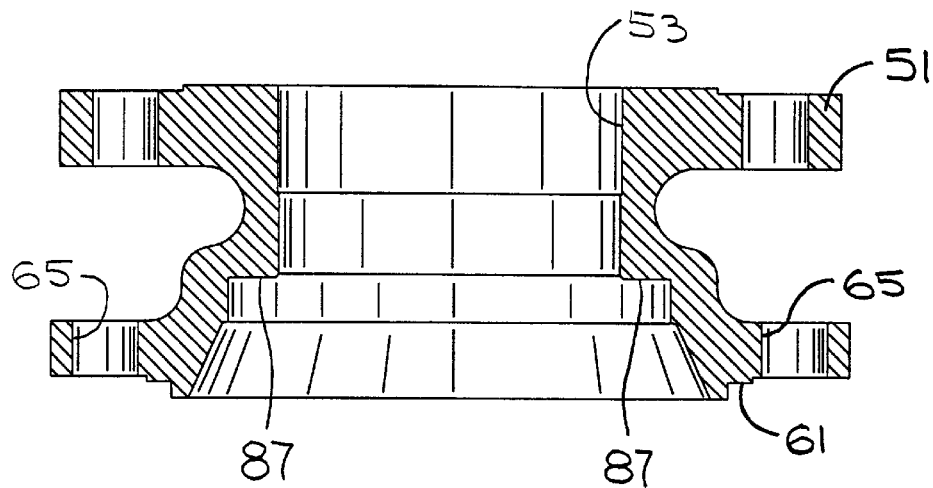
FIG. 3 is a vertical section of an upper body of the valve.
Figure 4:
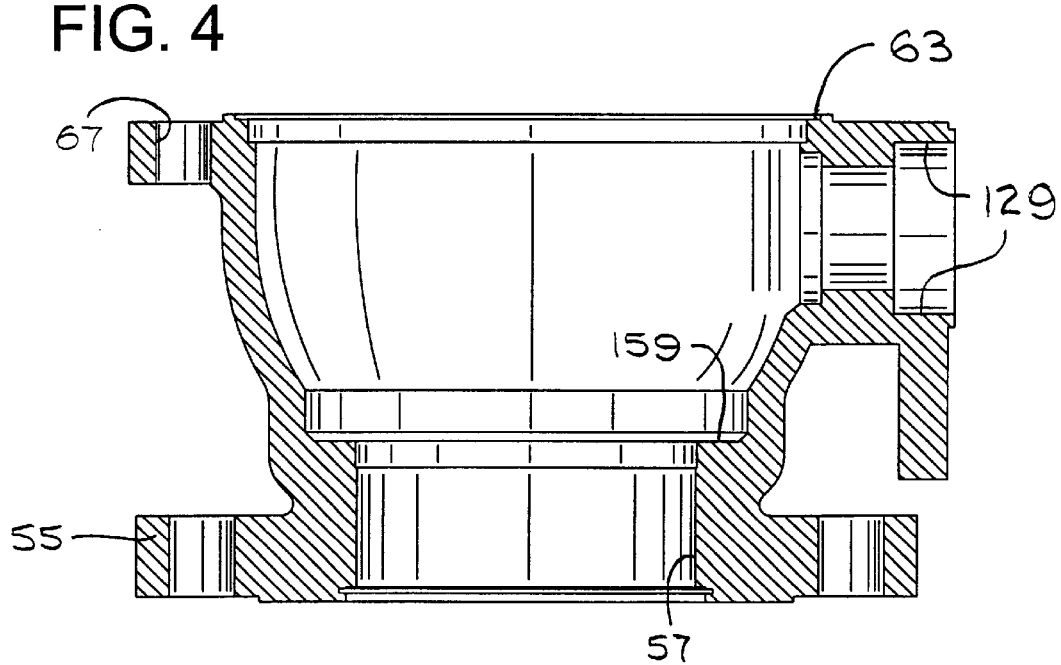
FIG. 4 is a vertical section of a lower body of the valve.

Referring now to FIG. 2, a non-contaminating gas-tight valve of the present invention 41 is shown. The valve generally comprises an upper body 51 having an inlet 53 (FIG. 3) and a lower body 55 having an outlet 57 (FIG. 4). The upper body 51 has a lower annular flange 61, and the lower body 55 has an upper annular flange 63. The upper body 51 mounts on the lower body 55 such that the lower annular flange 61 abuts the upper annular flange 63. An elastic sealing element 64, such as an o-ring, fits between the upper and lower flanges 61,63, forming a seal between the upper and lower bodies 51,55 (FIG. 2). The lower flange 61 contains a plurality of unthreaded bolt holes 65 while the upper flange 63 contains a plurality of threaded holes 67. When the upper body 51 mounts on the lower body 55, the unthreaded holes 65 match positions with the threaded holes 67 so that threaded studs 73 may be inserted downwardly through the upper body 51 and threaded into the lower body 55. Nuts 74 thread down over the threaded studs 73 and bear against the upper body 51, holding the valve 41 together (FIG. 2). In the preferred embodiment, multiple threaded studs 73 and nuts 74 secure the upper and lower bodies 51,55 together. Additionally, the upper body 51 and lower body 55 of the preferred embodiment are preferably formed from metal, such as stainless steel. Other materials exhibiting adequate strength and rigidity characteristics may also be used without departing from the scope of the invention.

The valve 41 is designed to control a flow of granular polysilicon within the handling system 31 and create a gas-tight seal within the system. The granular polysilicon is fed through the valve 41 by gravity. When the valve 41 is closed, no granular polysilicon flows through the valve. When the valve 41 is open, granular polysilicon will flow downward through the valve, entering the valve at the top of the upper body 51 and exiting the valve at the bottom of the lower body 55.

Figure 5:
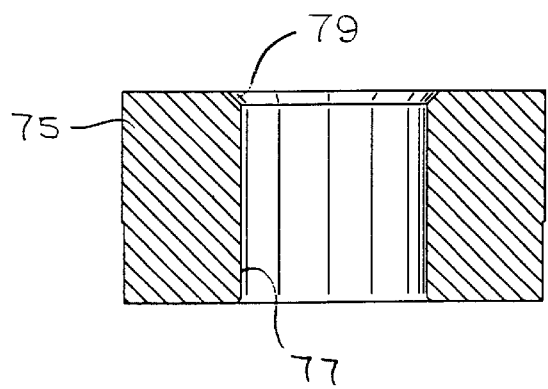
FIG. 5 is a vertical section of an upper body insert of the valve.
Figure 6:
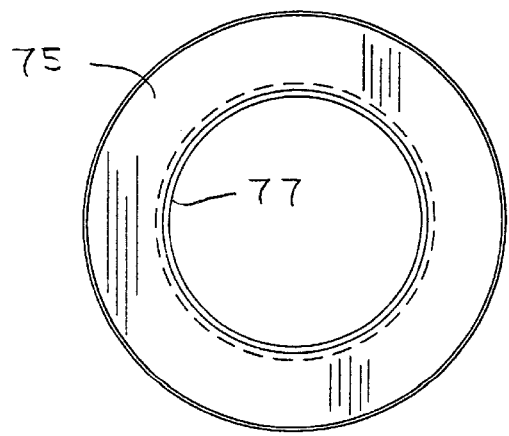
FIG. 6 is a bottom plan view of the upper body insert of FIG. 5.

Upon entering the valve 41, the granular polysilicon passes through an upper body insert 75 (FIGS. 2, 5, and 6). The upper body insert 75 is annularly shaped, fitting snugly within the mating cylindrical inlet 53 formed in the upper body 51 of the valve 41. The upper body insert 75 has a passage 77 formed vertically through the insert (FIG. 5). The passage 77 is the first passage the granular polysilicon flows through as it travels through the valve 41. The upper edge of the cylindrical passage is defined by a chamfer 79. The upper body insert 75 should be constructed of a material that can direct large quantities of granular polysilicon into the valve 41 while minimizing the number of foreign particles contaminating the system due to wear of the insert. In the preferred embodiment, the upper body insert 75 is formed from single-crystal silicon so that any wear of the insert within the flow of granular polysilicon will only minimally contaminate the system 31, since the particles created are single-crystal silicon of purity equivalent to that of granular polysilicon.

Figure 7:
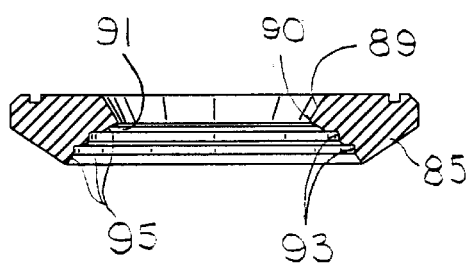
FIG. 7 is a vertical section of an upper annular seat of the valve.
Figure 8:
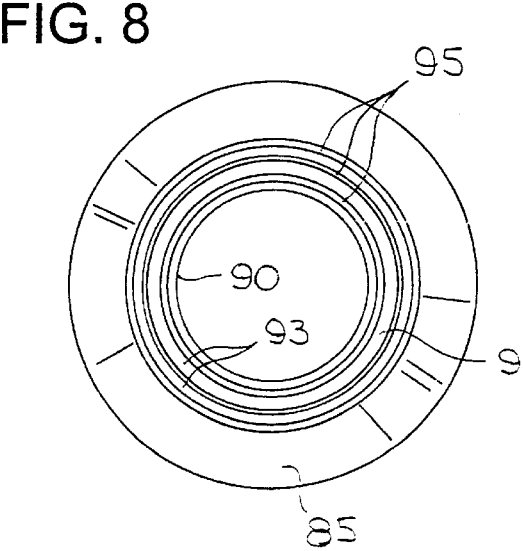
FIG. 8 is a bottom plan view of the upper annular seat of FIG. 7.
Figure 7A:
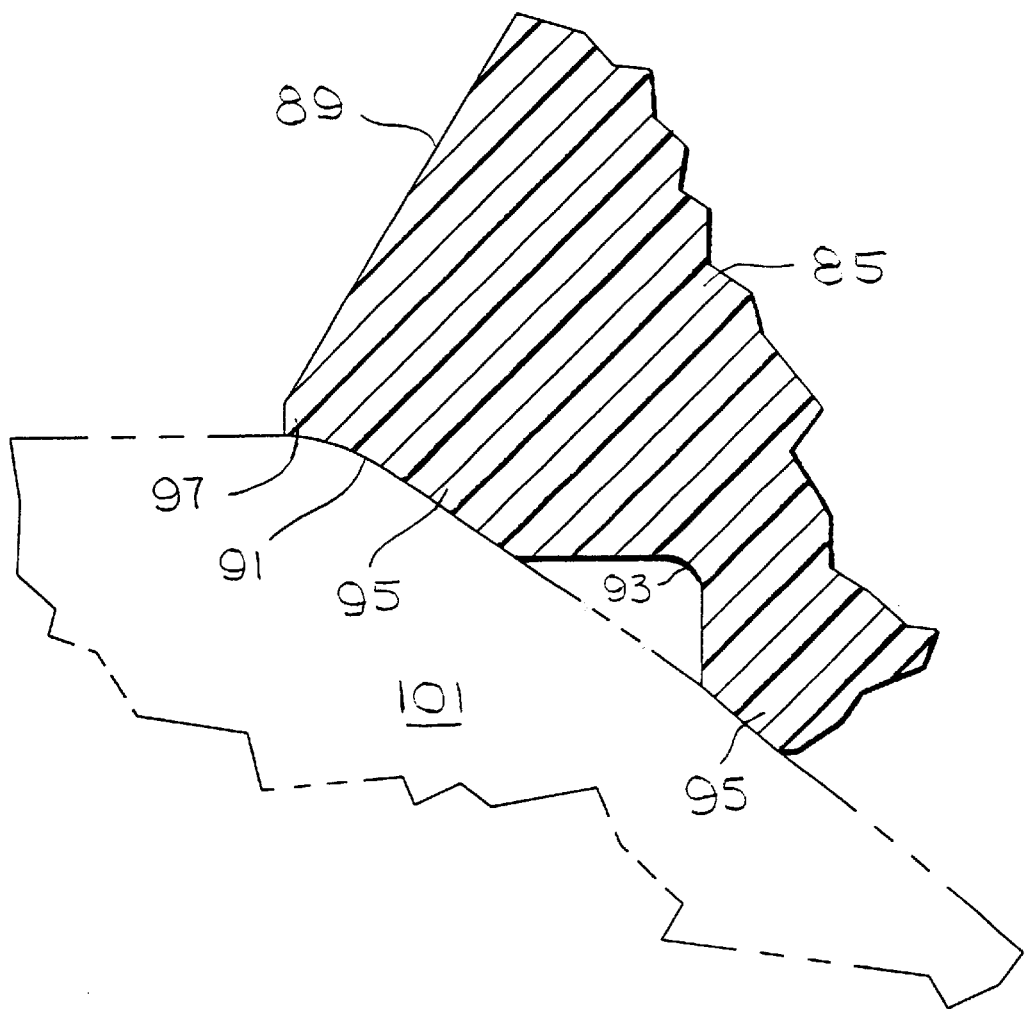
FIG. 7A is an enlarged, partial vertical section of the upper annular seat of FIG. 7.

After flowing through the upper body insert 75, the granular polysilicon passes through an upper annular seat 85, as shown in FIGS. 2, 7, and 8. The upper annular seat 85 is generally ring-shaped. The seat 85 is received against an annular shoulder 87 formed in the upper body 51. The seat 85 additionally has a frustoconical inlet face 89, which is wider than the cylindrical passage 77 of the upper insert 75, such that the granular polysilicon will flow from the upper insert through an opening 90 in the annular seat with little contact with the annular seat (FIG. 2). The seat 85 has a frustoconical outlet face 91 having two circumferential grooves 93 formed in its face (FIGS. 7 and 8). The grooves 93 create a series of three circumferential ridges 95. In addition, the innermost ridge 95 has a lip 97, which extends laterally inwardly from the seat 85, as discussed infra (FIG. 7A).

Below the upper annular seat 85 is the ball valve member 101 of the present invention, described in more detail below (FIGS. 2, 7A, 9–11). The primary function of the upper annular seat 85 is to form a seal between the ball valve member 101 and the upper body 51. In the preferred embodiment, the ball valve member 101 is a rotatable ball valve. The three circumferential ridges 95 of the annular seat 85 press against the ball valve member 101, creating a tight seal between the valve and seat (FIG. 2). In the preferred embodiment, the annular seat 85 is formed from polytetrafluoroethylene so that the ball valve member 101 can move freely against the annular seat, while creating an adequate seal.

Figure 9:
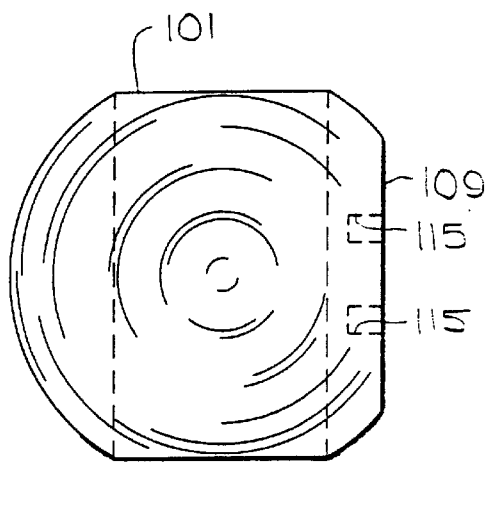
FIG. 9 is a front elevation of a valve member of the valve.
Figure 10:
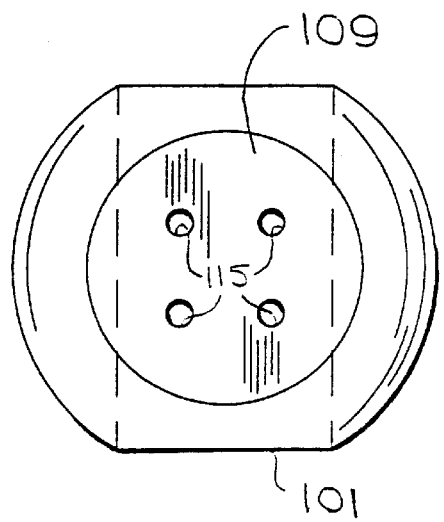
FIG. 10 is a right side elevation of the valve member of FIG. 9.
Figure 11:
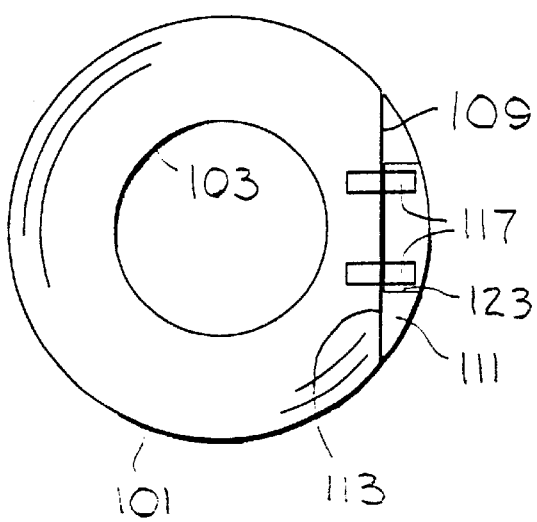
FIG. 11 is a top plan view of the valve member.
Figure 12:
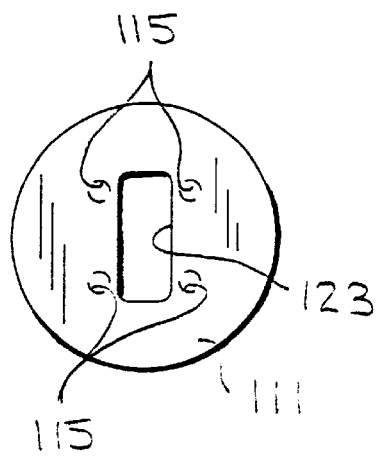
FIG. 12 is right side elevation of an actuation chord of the valve member of FIG. 11.

Referring now to FIGS. 9–11, the ball valve member 101 has a cylindrical passage 103 through the valve, allowing the flow of granular polysilicon to pass through the valve (FIG. 11). In an open position (as shown in FIG. 2), the passage 103 is oriented vertically so that the granular polysilicon can pass through the ball valve member 101. The ball valve member 101 is rotatable about a horizontal axis A (FIG. 2), which is perpendicular to the cylindrical passage 103. When the ball valve member 101 rotates ninety degrees, the solid portion of the valve member entirely covers the opening 90 in the upper annular seat 85, blocking the flow of granular polysilicon or gas through the valve 41.

As the ball valve member 101 rotates, the lip 97 wipes the surface of the valve member clean. The grooves 93 of the seat 85 allow for deformation of the outlet face 91, so that the ridges can slightly deform during installation, conforming to the shape of the ball valve member 101. When the ball valve member 101 rotates, excess granular polysilicon trapped between the valve member and ridges 95 can work into the grooves 93, keeping the seal intact. The lip 97 presses firmly against the ball valve member, acting as a wiping element. In the preferred embodiment, the ball valve member 101 is manufactured from single-crystal silicon having a highly polished, mirror-like surface. Single-crystal silicon is rigid enough to create a tight seal with the upper annular seat 85. More importantly, the wiping action, working jointly with the mirror-like surface of the ball valve member 101, inhibits wear by reducing the tendency of the granular polysilicon to stick to the valve member, which can increase wear on the seat 85 by rubbing against the seat as the valve member moves. Any minimal wear of the ball valve member 101 will create single-crystal silicon particulate matter, which can be tolerated as a contaminant since the flow is granular polysilicon. Accordingly, creating a ball valve member 101 of single-crystal silicon reduces the likelihood of harmful contaminants within the flow of granular polysilicon material. Although single-crystal silicon is the preferred material for the valve member, it is envisioned that other materials such as silicon carbide, tungsten carbide, and silicon nitride may also be used without departing from the scope of the invention.

Because the ball valve member 101 must rotate within the body 51, 55, a valve rotation mechanism is required to move the valve member within the valve 41. Referring to FIGS. 9 and 10, a section of the ball valve member 101 is not completely spherical, but rather has a first flat face 109 on one side of the valve member. An actuation chord 111, having a second flat face 113, fits against the first face 109 of the ball valve member 101, completing the spherical shape of the valve member (FIG. 11). The first and second flat faces 109, 113 each have four holes 115 in registration with each other (FIGS. 9–12). Four connecting pins 117 fit within the holes 115 of each face 109, 113 thereby connecting the two faces together in a fixed orientation. The actuation chord 111 and connecting pins 117 are preferably formed from stainless steel. Furthermore, a layer of adhesive material between the first face 109 and second face 113 holds the ball valve member 101 and actuation chord 111 together. In the preferred embodiment, the adhesive is an epoxy suitable for securing the ball valve member 101 valve to the actuation chord 111. Finally, the actuation chord 111 has a rectangular notch 123 formed in its curved face, as further described below.

A ball valve stem 127 extends laterally from a side of the valve 41 for rotating the ball valve member 101 (FIGS. 2, 13, and 14). The valve stem 127 is generally cylindrical in shape and designed to rotate along a central longitudinal axis A. The valve stem 127 passes through a cylindrical opening 129 formed within the lower body 55 (FIGS. 2 and 4). The valve stem 127 rotates freely on a bearing 130 within the opening 129 and is sealed in the lower body 55 by a seal 131 and seal compression nut 133 (FIG. 2). An inner end of the valve stem 127 has a key 135. The key 135 engages the rectangular notch 123 formed in the actuation chord 111. As the valve stem 127 rotates about its longitudinal axis A, the key 135 presses against the notch 123, causing the entire ball valve member 101 to rotate with the valve stem. By rotating the valve stem 127, a user can control valve position and flow through the valve.

Between the valve stem 127 and the actuation chord 111, a carrier 141 acts to carry a shield 149 (FIGS. 2, 15–17). The carrier 141 is generally conical in shape, having an arcuate interior wall 143 which mates with the chord 111. The carrier 141 inhibits granular polysilicon from contaminating the interface between the key 135 and the actuation chord 111, where it could increase wear. Further, the exterior wall 145 of the carrier 141 is generally flat and includes an annular recess 147 formed about the edge to carry the shield 149. The shield 149 fits between the carrier 141 and the upper and lower body 51, 55, within the annular recess 147, to protect the stem assembly from dust and other particulate matter (FIG. 2). In the preferred embodiment, the carrier 141 and shield 149 are formed from polytetrafluoroethylene, although other materials exhibiting similar characteristics are also contemplated as within the scope of the present invention.

Figure 19:
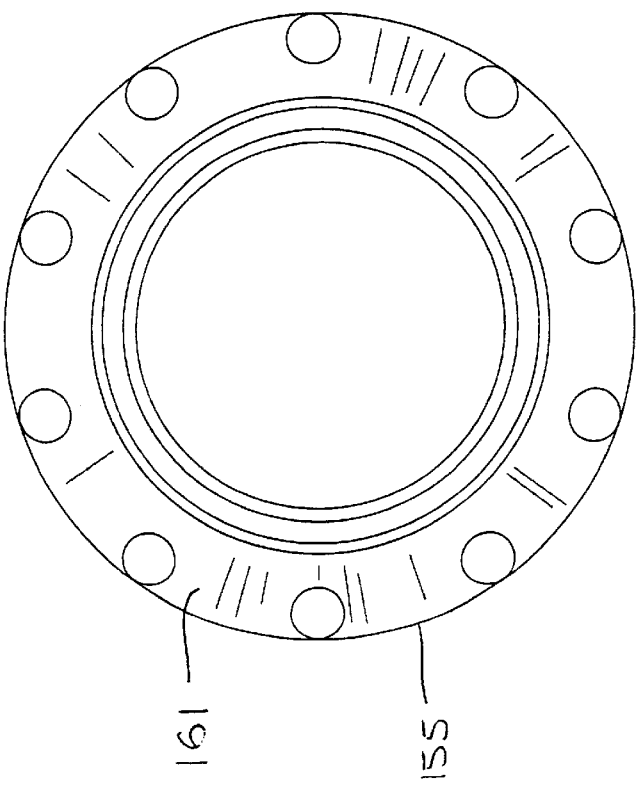
FIG. 19 is a top plan view of the lower annular seat of FIG. 18.
Figure 18:
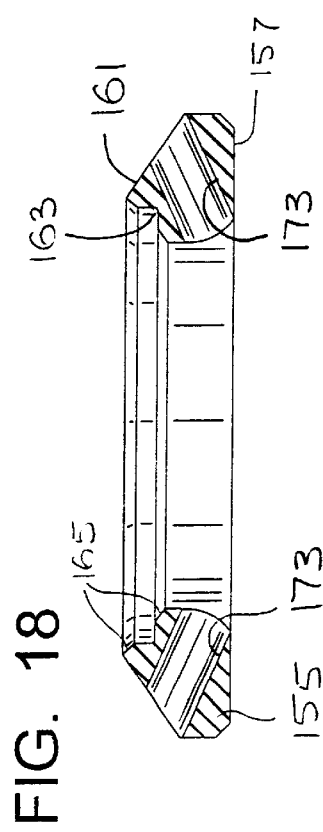
FIG. 18 is a vertical section of a lower annular seat of the valve.

Downstream of the ball valve member 101, the granular polysilicon passes through a lower annular seat 155 (FIGS. 2, 18, and 19). Like the upper annular seat 85, the lower seat 155 is generally ring-shaped and presses against the ball valve member 101. The seat 155 has a lower face 157 which rests against a shoulder 159 formed in the lower body 55. The seat 155 has a frustoconical inlet face 161 having one circumferential groove 163 formed in its face (FIG. 18). This groove 163 is flanked by a pair of circumferential ridges 165 that extend from the frustoconical inlet face 161. The circumferential ridges 165 of the lower annular seat 155 rest against the ball valve member 101.

The gas-tight valve can accommodate granular polysilicon that may slip past the seal between the upper annular seat 85 and the ball valve member 101. An annular cavity 171 formed between the body 51,55 and the ball valve member 101 allows the granular polysilicon to pass through the valve 41 should some slip past the seat 85. The excess granular polysilicon then passes by gravity to the lower portion of the cavity 171. To that end, the lower annular seat 155 has a plurality of drain holes 173 formed therein. The drain holes 173 connect the cavity 171 to the central portion of the valve 41. These drain holes 173 allow excess granular polysilicon to exit the cavity 171. Without these drain holes 173, as with some previous valve designs, excess material can build up within the valve cavity 171, causing the valve 41 to seize, wear, or fail.

Figure 20:
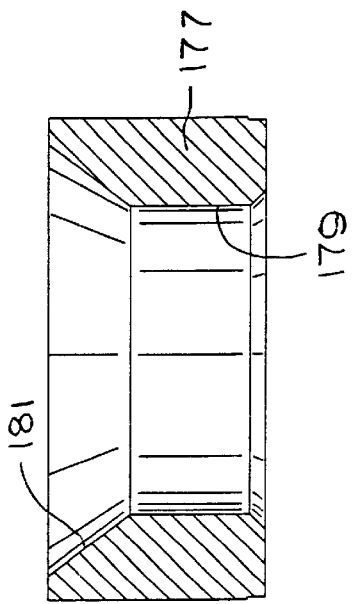
FIG. 20 is a vertical section of a lower body insert of the valve.
Figure 21:
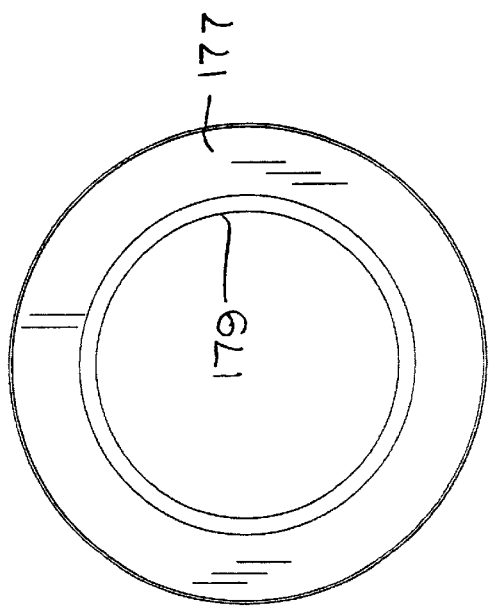
FIG. 21 is a bottom plan view of the lower body insert of FIG. 20.

Finally, the granular polysilicon passes through a lower body insert 177 (FIGS. 2, 20, and 21). The lower body insert 177 is annular, fitting snugly within a mating cylindrical cavity formed in the lower body 55 of the valve 41. The lower body insert 177 has a cylindrical passage 179 formed vertically through the insert. The cylindrical passage 179 is the last passage the granular polysilicon flows through as it travels through the valve 41. The upper portion of the cylindrical passage 179 is defined by conical wall 181, allowing the upper opening to be wider than the opening in the annular seat 155 or the ball valve member 101. In the preferred embodiment, the lower body insert 177 is formed from single-crystal silicon so any insert wear creates particles within the flow of granular polysilicon that will not contaminate the system 31 because they are single-crystal silicon fragments.

The valve 41 of the preferred embodiment is operable over a pressure range of between about full vacuum to about 517 kilo-Pascals (75 pounds per square inch). The use of stainless steel, polytetrafluoroethylene, and single-crystal silicon for valve parts allows the valve to function within the given pressure range. In addition, the valve parts are designed to allow adequate part clearance when they expand or contract due to environmental or process conditions.

In view of the above, it will be seen that the several objects of the invention are achieved and other advantageous results attained.

When introducing elements of the present invention or the preferred embodiment(s) thereof, the articles "a," "and "the," and "said" are intended to mean that there are one or more of the elements. The terms "comprising," "including," and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A valve apparatus for controlling a flow of granular polysilicon, which inhibits contamination of the granular polysilicon by foreign materials, the valve apparatus comprising:

a valve body having an inlet, an outlet, and a passage extending between the inlet and outlet for flow of granular polysilicon through the valve body;

a movable valve member substantially spherical in shape and disposed in the passage within the valve body for regulating the flow through the valve body, said movable valve member having highly polished surfaces exposed to engage the granular polysilicon formed from single-crystal silicon to reduce valve wear and inhibit creation of particulate contaminants within the flow of granular polysilicon, said surfaces further inhibiting erosion and ensuring that any erosion of the surface will be non-contaminating, said movable valve member has a cylindrical passage therein for allowing granular polysilicon to flow through the valve member, wherein said movable valve member is movable between an open position where the granular polysilicon may flow through the valve body and a closed position where the granular polysilicon cannot flow through the valve body; and two annular seats, the movable valve member being seated against and rotatable with respect to the two annular seats, wherein one of said annular seats is an upper annular seat and the other annular seat is a lower annular seat, said upper annular seat being upstream of the movable valve member and said lower annular seat being downstream of the movable valve member, said valve member and the upper annular seat are sized and arranged within the valve body such that the annular seat has a tight fit against the valve member, and the valve, when closed, creates a gas tight seal between the inlet and outlet of the valve, wherein said valve body is further constructed to be substantially larger that the valve member such that there is an annular cavity between the valve member and the valve body, said annular cavity being outside the flow of granular polysilicon and acting as an overflow portion of the valve to keep excess granular polysilicon which may pass between the upper annular seat and the valve member from accumulating within the valve, causing the valve to seize, said lower annular seat having at least one drain hole in constant fluid communication with the annular cavity and the valve body passage for allowing excess granular polysilicon in the annular cavity to exit the valve body said valve apparatus being constructed with materials that render the valve apparatus operable over a pressure range of between about full vacuum to about 517 kilo-Pascals (75 pounds per square inch).

2. A valve apparatus as set forth in claim 1 wherein the upper annular seat further comprises a lip, engagement of the valve member with said lip during rotation of the valve member relative to the seat wipes the valve member clean.

3. A valve apparatus as set forth in claim 1 wherein said annular seats are formed from polytetrafluoroethylene.

4. A valve apparatus as set forth in claim 1 wherein said valve member is formed from single-crystal silicon to reduce wear of the valve member against the two annular seats and inhibit creation of metal particles or similar contaminants within the flow of granular polysilicon.

5. A granular polysilicon handling system for controlling a flow of granular polysilicon, the handling system comprising:

at least one material hopper sized and shaped to hold granular polysilicon within the system; and at least one valve apparatus in fluid connection with the material hopper, the valve apparatus comprising:

a valve body having an inlet, an outlet, and a passage extending between the inlet and outlet for flow of granular polysilicon through the valve body;

a movable valve member substantially spherical in shape and disposed in the passage within the valve body for regulating the flow through the valve body, said movable valve member having highly polished surfaces exposed to engage the granular polysilicon formed from single-crystal silicon to reduce valve wear and inhibit creation of particulate contaminants within the flow of granular polysilicon, said surfaces further inhibiting erosion and ensuring that any erosion of the surface will be non-contaminating, said movable valve member has a cylindrical passage therein for allowing granular polysilicon to flow through the valve member, wherein said movable valve member is movable between an open position where the granular polysilicon may flow through the valve body and a closed position where the granular polysilicon cannot flow through the valve body; and two annular seats, the movable valve member being seated against and rotatable with respect to the two annular seats, wherein one of said annular seats is an upper annular seat and the other annular seat is a lower annular seat, said upper annular seat being upstream of the movable valve member and said lower annular seat being downstream of the movable valve member, said valve member and the upper annular seat are sized and arranged within the valve body such that the annular seat has a tight fit against the valve member, and the valve, when closed, creates a gas tight seal between the inlet and outlet of the valve, wherein said valve body is further constructed to be substantially larger that the valve member such that there is an annular cavity between the valve member and the valve body, said annular cavity being outside the flow of granular polysilicon and acting as an overflow portion of the valve to keep excess granular polysilicon which may pass between the upper annular seat and the valve member from accumulating within the valve, causing the valve to seize, said lower annular seat having at least one drain hole in constant fluid communication with the annular cavity and the valve body passage for allowing excess granular polysilicon in the annular cavity to exit the valve body said valve apparatus being constructed with materials that render the valve apparatus operable over a pressure range of between about full vacuum to about 517 kilo-Pascals (75 pounds per square inch).

6. A granular polysilicon handling system as set forth in claim 5 further comprising conduit extending from the hopper for delivery of granular polysilicon, the valve apparatus connected to the conduit.

* * * * *